(12) United States Patent
Hunter, Jr.

(10) Patent No.: US 7,102,244 B2
(45) Date of Patent: Sep. 5, 2006

(54) VEHICLE ACTUATED ROAD IMBEDDED MAGNETO GENERATOR

(76) Inventor: John P. Hunter, Jr., 344 Country Rd. 39A, Southampton, NY (US) 11968

(*) Notice: Subject to any disclaimer, the term of this patent is extended or adjusted under 35 U.S.C. 154(b) by 943 days.

(21) Appl. No.: 10/263,789

(22) Filed: Oct. 3, 2002

(65) Prior Publication Data

US 2004/0066041 A1    Apr. 8, 2004

(51) Int. Cl.
*F03G 3/00* (2006.01)
(52) U.S. Cl. .................................................... 290/1 R
(58) Field of Classification Search ............... None
See application file for complete search history.

(56) References Cited

U.S. PATENT DOCUMENTS

| | | |
|---|---|---|
| 3,745,450 A | 7/1973 | Wilt ........................... 324/41 |
| 4,081,224 A | 3/1978 | Krupp |
| 4,132,074 A | 1/1979 | Wendel |
| 4,173,431 A | 11/1979 | Smith |
| 4,212,598 A | 7/1980 | Roche et al. |
| 4,232,285 A | 11/1980 | Narbaits-Jaureguy |
| 4,238,687 A | 12/1980 | Martinez |
| 4,239,974 A * | 12/1980 | Swander et al. ............ 290/1 R |
| 4,239,975 A | 12/1980 | Chiappetti |
| 4,250,395 A * | 2/1981 | Lundgren .................. 290/1 R |
| 4,322,673 A | 3/1982 | Dukess |
| 4,339,920 A | 7/1982 | Le Van |
| 4,418,542 A | 12/1983 | Ferrell |
| 4,500,827 A * | 2/1985 | Merritt et al. ................. 322/3 |
| 4,614,875 A * | 9/1986 | McGee ....................... 290/1 R |
| 4,739,179 A * | 4/1988 | Stites ......................... 290/1 R |
| 5,081,848 A | 1/1992 | Rawlings et al. |
| 5,243,146 A | 9/1993 | Nishitani |
| 5,347,186 A * | 9/1994 | Konotchick ................. 310/17 |
| 5,818,132 A * | 10/1998 | Konotchick ................. 310/17 |
| 5,850,192 A | 12/1998 | Turk et al. |
| 6,166,660 A | 12/2000 | Grenier |
| 6,172,426 B1 | 1/2001 | Galich ....................... 290/1 R |
| 6,204,568 B1 | 3/2001 | Runner |
| 6,949,840 B1 * | 9/2005 | Ricketts ..................... 290/1 R |
| 2003/0034652 A1 * | 2/2003 | Slatkin ....................... 290/1 R |

FOREIGN PATENT DOCUMENTS

| | | |
|---|---|---|
| DE | 3717893 A1 * | 12/1988 |
| FR | 2823262 A1 * | 10/2002 |
| GB | 2275828 A * | 9/1994 |
| GB | 2290115 A * | 12/1995 |
| WO | WO 9516133 A1 * | 6/1995 |

* cited by examiner

*Primary Examiner*—Joseph Waks
(74) *Attorney, Agent, or Firm*—Alfred M. Walker

(57) ABSTRACT

An electrical generating system includes a plurality of linear operating magnetos impeded within a roadway pavement, whereby the passage of vehicle wheels from moving motor vehicles directly depresses linear solenoid plungers for generating electricity, without the need for the extra energy consumption drawbacks, such as bellows, compressed air or ratchet mechanisms.

16 Claims, 5 Drawing Sheets

VEHICLE ACTUATED ROAD IMBEDDED MAGNETO GENERATOR

FIELD OF THE INVENTION

The present invention relates to vehicle actuated road imbedded magneto generators.

BACKGROUND OF THE INVENTION

Among related patents include U.S. Pat. No. 6,204,568 of Runner, which has a ratchet plunger connected to air flow turbines for converting mechanical motion of vehicles moving in traffic to electrical energy.

Also, U.S. Pat. No. 4,614,875 of McGee has a similar vehicle wheel actuated electrical generator such as a rotor and stator generator, i.e., an AC generator or a DC dynamo.

The other patents disclose auxiliary mechanical devices such as inflatable bladders or gears that produce mechanical energy which is converted to electrical energy by a generator. These devices are not efficient because of the extra auxiliary mechanical step in producing electrical energy.

For example, U.S. Pat. No. 4,339,920 of Le Van, U.S. Pat. No. 4,322,673 of Dukess, U.S. Pat. No. 4,418,542 of Ferrell, U.S. Pat. No. 4,081,224 of Krupp, U.S. Pat. No. 4,212,598 of Roche, U.S. Pat. No. 4,173,431 of Smith and U.S. Pat. No. 6,172,426 of Galich all use vehicle tire movement responsive fluid compressors to produce electrical or mechanical energy.

Furthermore, U.S. Pat. No. 4,239,975 of Chiappetti uses a vehicle tire responsive flywheel to power an electrical generator.

Moreover, U.S. Pat. No. 4,238,687 of Martinez generates power from the movement of motor vehicle tires over a roadway with a plurality of pivoting treadles plates having ratchet teeth moving a ratchet turbine wheel.

In addition, U.S. Pat. No. 5,081,848 of Rawlings and U.S. Pat. No. 4,132,074 of Wendel describe underground pavement de-icers.

However, these patents do not describe an electrical generating system wherein a plurality of linear operating magnetos are physically imbedded within a roadway pavement. The passage of vehicle wheels from moving motor vehicles directly depresses linear solenoid plungers for generating electricity. This can be done without the need for the auxiliary energy consumption drawbacks of the known prior art patents, which need bellows, compressed air devices, etc. to convert the energy indirectly.

OBJECTS OF THE INVENTION

It is therefore an object of the present invention to provide a an electrical generating system wherein a plurality of linear operating magnetos are physically imbedded within a roadway pavement, without the need for the auxiliary energy consumption drawbacks of the known prior art patents, such as bellows, compressed air devices, etc. to convert the energy indirectly.

It is also an object of the present invention to provide a low cost energy generation system.

Other objects which become apparent from the following description of the present invention.

SUMMARY OF THE INVENTION

In keeping with these objects and others which may become apparent, the present invention is directed to an electrical generating system wherein a plurality of linear operating magnetos are physically imbedded within a roadway pavement. The passage of vehicle wheels from moving motor vehicles directly depresses linear solenoid plungers for generating electricity.

This can be done without the need for the auxiliary energy consumption drawbacks of the known prior art patents, which need bellows, compressed air devices, etc. to convert the energy indirectly.

The system of the present invention as described generates electrical energy from vehicular traffic moving on a roadway. Generating modules in the form of long narrow strips are imbedded in the expansion joints of concrete roadways across traffic lanes. Cam elements are used to momentarily engage the tires of moving vehicles so as to mechanically move a shaft that is part of a linear multi-coil, multi-magnet magneto generator imbedded below grade. After the vehicle tire moves off the cam element, it is returned to its original position by a spring which had been compressed by the force of the vehicle tire. In this manner, pulses of electricity are generated on both up and down strokes of the linear magneto generator. By using a series wiring of the coil elements in a single generating module and passing the current through a bridge rectifier, high voltage uni-directional voltage pulses are generated. The output of multiple generating modules are then wired in a parallel network and fed to an electrical storage device. When the state of charge in the storage element is sufficient, a synchronous inverter is started to convert the generated electrical pulse energy thus stored to AC line compatible power for distribution to the power network.

Therefore, the present invention includes a motor vehicle-actuated electrical generating system disposed within the pavement of a roadway having a surface area upon which vehicles drive.

A plurality of spaced-apart housings, such as elongated hollows extend downward vertically from the roadway surface, wherein the hollows respectively having magnetos disposed therein.

Each magneto respectively has a plunger, which is alternately movable between a raised position and a lowered position. The plunger extends vertically downward from the roadway surface within each elongated hollow, which may be cylindrical or of another elongated open space configuration.

The plunger has an upper end with a roadway treadle, which treadle bears on the plunger. The treadle is substantially parallel with the roadway surface when the plunger is in the raised position. The plunger also has a lower end, which lower end is mounted to a compressible spring, urging the plunger into the raised position.

The plunger is caused to move from the raised to the lowered position by the application of vehicle tire weight upon the treadle and the plunger is caused to move from the lowered to the raised position by the spring when vehicle tire weight upon the treadle is released.

To produce electrical energy, the elongated hollows have mounted therewithin a plurality of vertically spaced-apart electrical coils, each having a respective central aperture, which central apertures are each a central vertically extending void through which the plunger extends. The plunger has a plurality of vertically spaced-apart magnets mounted thereon, which magnets are vertically movable with the movement of the plunger alternately between the raised and the lowered positions. The magnet movement is in close electrically-generating effective proximity to the coil, so that the magnet movement causes a flow of electrons within the coils. These coils are electrically connected so as to effectively and usefully collect the energy arising from the induced electron flow within the coils.

The spaced-apart elongated hollows are arranged in transverse rows across the roadway, in transverse rows which extend perpendicular to the direction of vehicle travel on the roadway.

These elongated hollows may be disposed within one or more expansion joints within the roadway. Preferably, these spaced-apart elongated hollows are arranged in one or more longitudinal bands, which comprise an elongated area of the roadway surface parallel to the direction of vehicular travel, so that at least one longitudinal band is positioned in a portion of the surface of the roadway having the greatest likelihood of being contacted by the tires of vehicles on the roadway i.e., in the portion of the lanes of traffic where tires are most likely to travel.

These longitudinal bands have a width sufficient to accommodate a plurality of the spaced-apart elongated hollows disposed in rows perpendicular to the direction of vehicular traffic on the roadway, such as three, four, five or six spaced apart elongated hollows.

The induced electrical energy is produced by the direct motion of the vertically spaced-apart plunger magnets in effective proximity to the vertically spaced-apart electrical coils, without the use of extra auxiliary mechanical movers, such as flywheels, air compressors, bellows, ratchets or any mechanical means other than the magnetos herein in order to capture, transmit, translate or convert mechanical energy into electrical energy.

One or more of the spaced-apart elongated hollows are positioned in close proximity to each other in an electrical generating module, which module has a hinged top plate acting as a cam, wherein the cam is in mechanical contact with the plungers of at least two of the spaced-apart elongated hollows. The cam is rotatably movable between a raised position and a depressed position when actuated by downwardly directed vehicle tire pressure. The cam downwardly depresses simultaneously each plunger within the plurality of spaced-apart elongated hollows for synchronizing the electrical output of the plurality of spaced-apart elongated hollows.

Preferably, the vertically spaced-apart electrical coils are wired in series to produce electrical output with synchronous polarity.

A bridge rectifier may be provided for preventing reverse current flow during electrical generation, wherein the vertically spaced-apart electrical coils are wired in series and the electrical generating module has at least one bridge rectifier to produce high-voltage uni-directional voltage pulses with each stroke of the plungers within the plurality of spaced-apart elongated hollows.

The modules may be wired in parallel. The electrical output produced by the electrical generating module is sent to electrical storage means, such as an electrical charge storage means, sensing the state and sufficiency of the stored electrical charge with a trigger and synchronous inverter for supplying the energy stored electrical charge to AC lines when triggered to do so by the trigger.

The spaced-apart elongated hollows may have sealing gaskets disposed at the surface of the roadway to seal the elongated hollows, and the treadle may have a noise reducer for damping the sounds of tires contacting the treadle.

The electrical storage means for storing the electrical output of the plurality of generating modules may be one or more batteries or one or more storage capacitors.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE INVENTION

Figure 1:
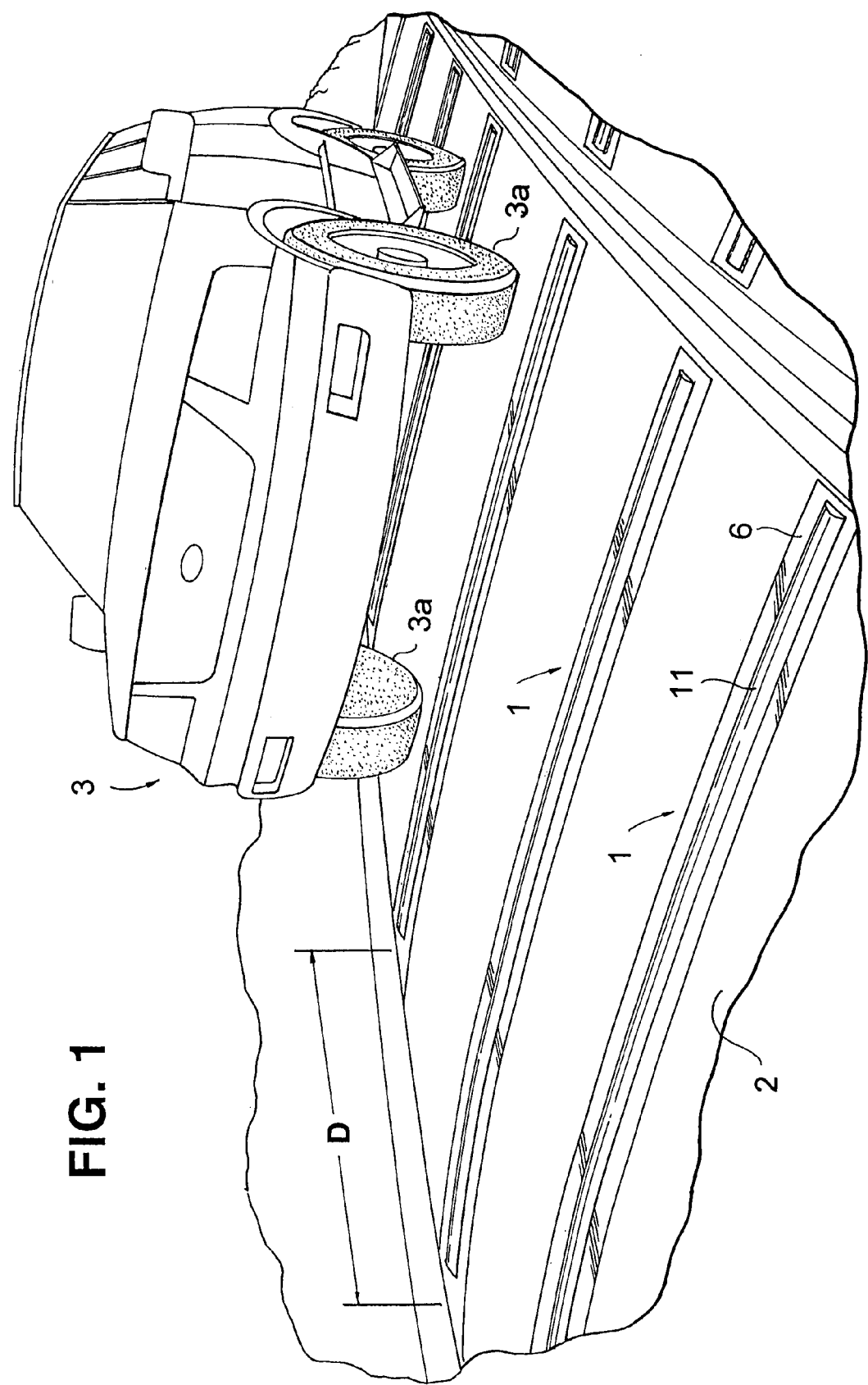
FIG. 1 is a Perspective view of generating modules embedded in a roadway.

FIG. 1 shows multiple generating modules 1 installed in the expansion joints between blocks of concrete road surface 2. They fit across an entire traffic lane width and therefore engage tires on both sides of a vehicle. Distance D from one generating module 1 to the next is approximately 60 feet (18 meters). expansion joints within the roadway.

Figure 1A:
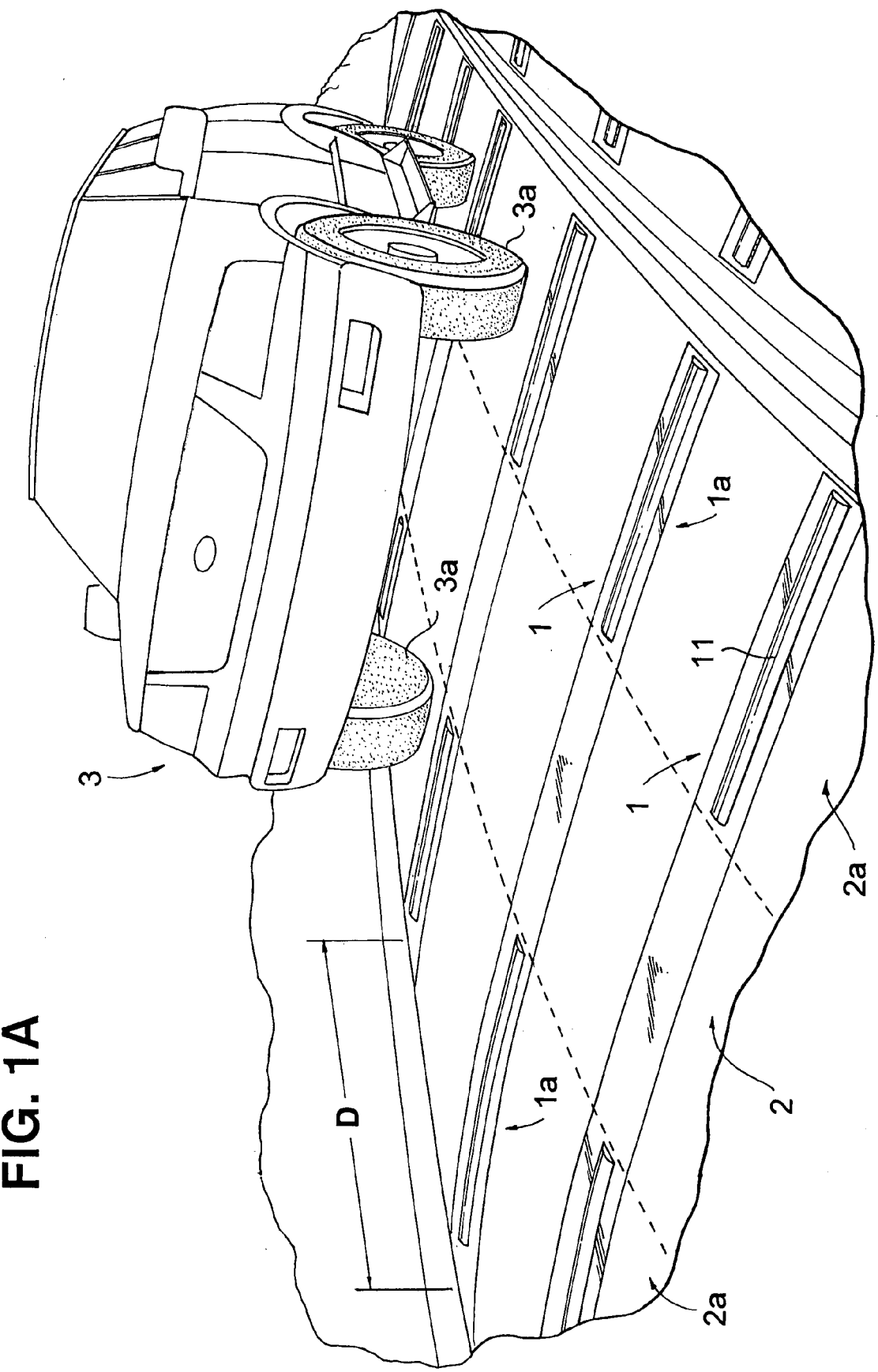
FIG. 1A is a Perspective view of an alternate embodiment of generating modules embedded in a roadway.

As further shown in FIG. 1, while modules 1 may extend across an entire length of road surface 2, preferably in an alternate embodiment shown in FIG. 1A, these spaced-apart modules 1 can be arranged in one or more longitudinal bands 1a, (indicated by the darkened cross-hatched portions of modules 1) which encompass elongated area portions 2a of roadway surface 2 parallel to the direction of vehicular travel, so that at least one longitudinal band 1a is positioned in an elongated area portion 2a of the surface 2 of the roadway having the greatest likelihood of being contacted by the tires 3a of vehicles 3 on the roadway i.e., in the portion of the lanes of traffic where tires 3a are most likely to travel.

Figure 2:
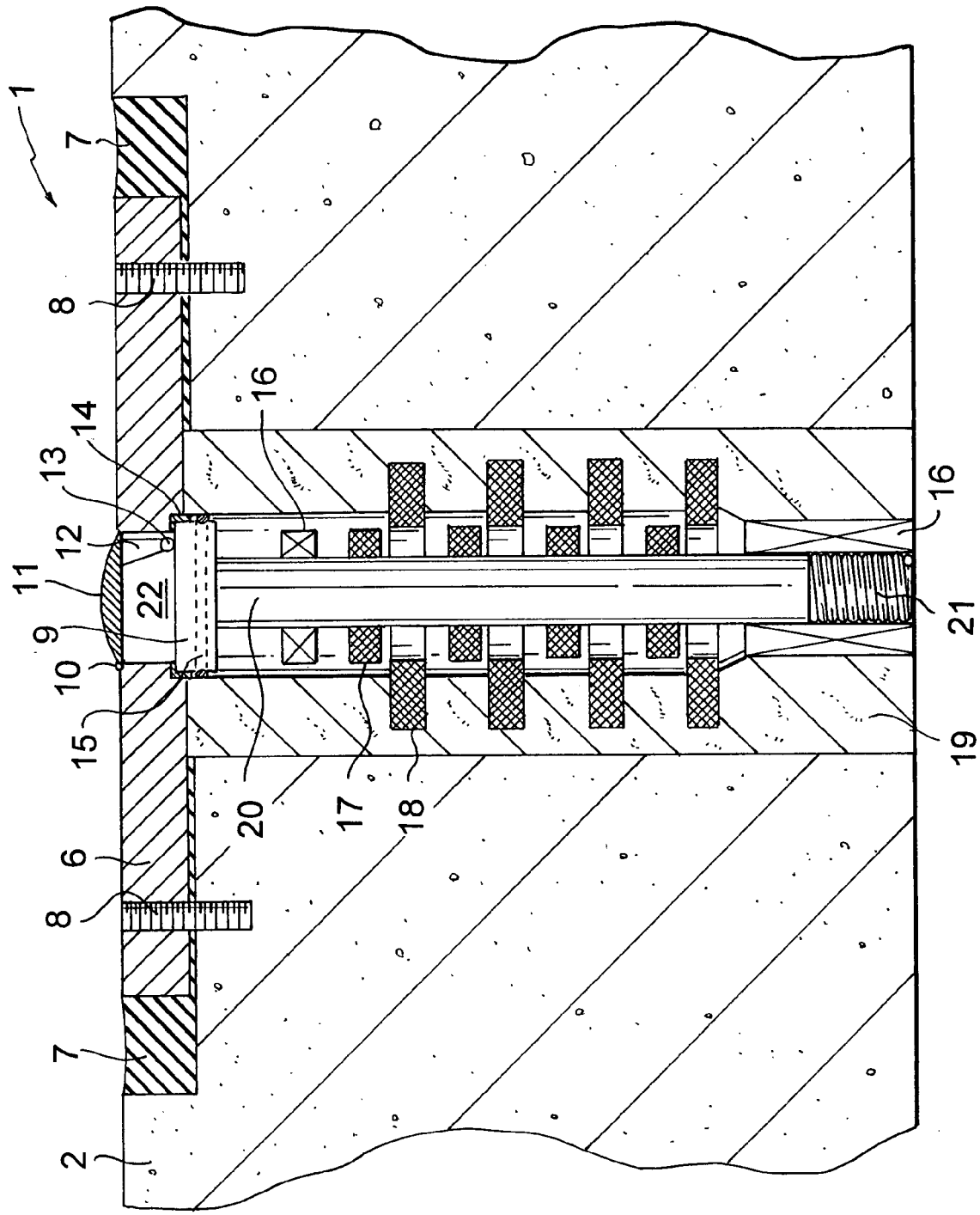
FIG. 2 is a Side view crossection of a generating module showing details of a linear magneto generator.

The side view in crossection of FIG. 2 shows details of linear magneto generator 22 with shaft 20, fixed linear bearings 16, four magnets 17 attached to reciprocating shaft 20, four fixed generator coils 18 and return spring 21. Coils 18 are fixed in potting compound 19. Although four coils 18 and four magnets 17 are illustrated, in some applications where the depth of the installation below grade is to be limited, two of each of these elements can be used. In other installations, as many as ten pairs or more of magnets 17 and coils 18 can be used. For the purpose of the remaining description four pairs will be assumed. Steel plunger head 9 engages with roller 13 on leg 12 which transmits vertical motion from cam 11 as it rotates downward on hinge 10. Rubber gasket 14 is used to reduce noise on rebound as well as sealing of the interior space. Additional sealing is provided by teflon seal 15. The structural installation is based on top steel plates 6 being screwed into concrete roadway 2 by fasteners 8. Expansion joint compound 7 seals plates 6 to concrete roadway 2.

Figure 3:
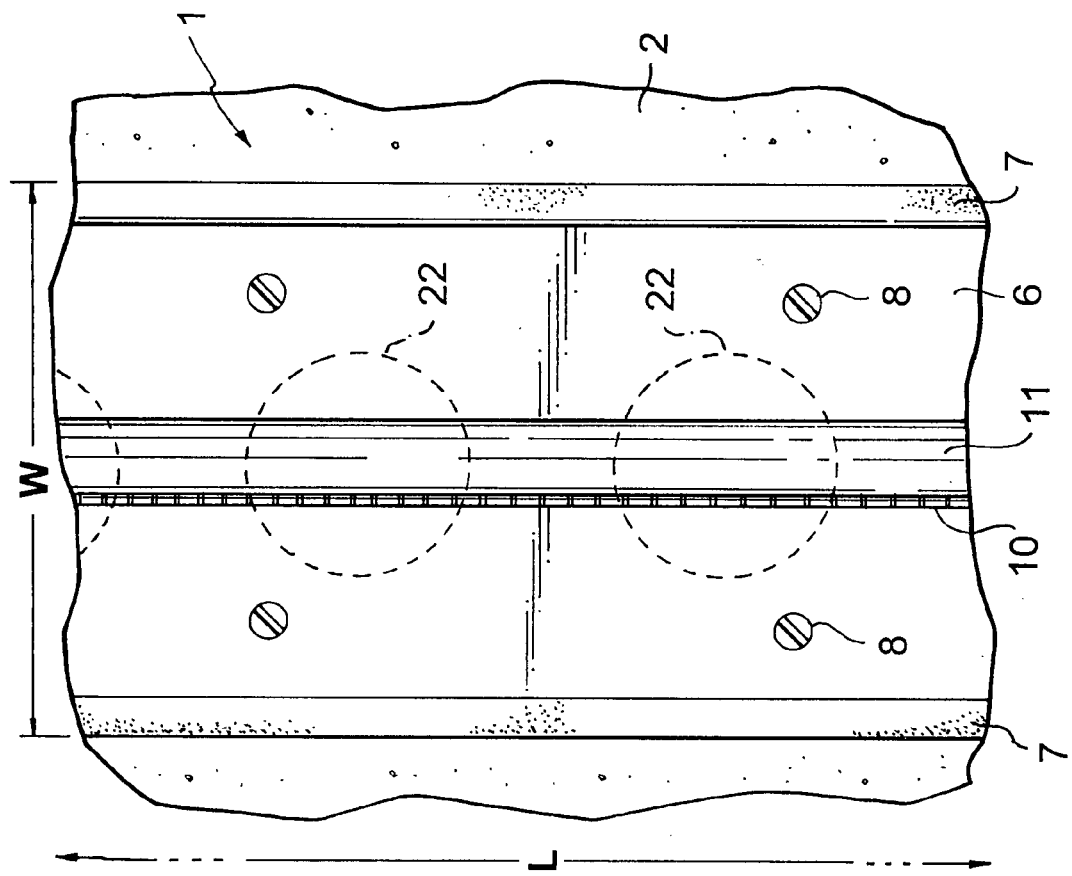
FIG. 3 is a Top view of a generating module of this invention.

FIG. 3 is a top view of a generating module showing the relative placement of the various elements from FIG. 2; two linear magneto generator elements 22 are shown. This number can vary in other embodiments. Width W is of the order of 2 inches (5 cm), and the length L is approximately 10 feet (3 meters).

Figure 4:
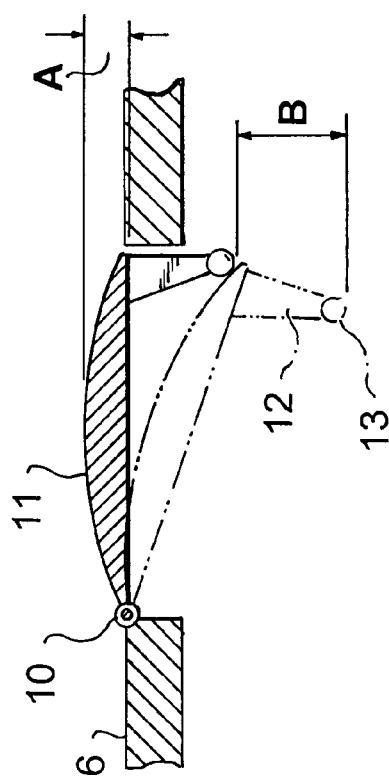
FIG. 4 is a Side view detail showing cam operation geometry.

FIG. 4 shows a detail of the movement of cam 11 which has a circular arc top surface and a segment profile. In its resting position (shown in solid lines) it protrudes a distance A above the road surface. When a tire contacts cam 11, it rotates downward on hinge 10 and moves through a vertical distance B which is a much greater than A (dashed lines). B is the stroke applied to generator shaft 20.

Since generator elements 22 within a single generating module 1 are mechanically synchronized by common cam 11, their electrical output is also synchronized as to voltage generated and polarity. Polarity generated by each coil 18 reverses when direction of shaft 20 reverses.

Figure 5:
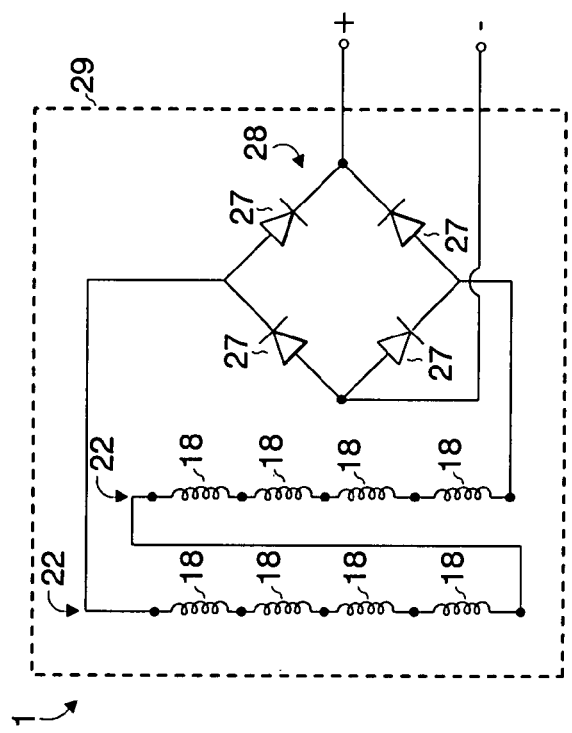
FIG. 5 is a Schematic diagram of the wiring of a single generating module.

By connecting all coils 18 in generating module 1 in series (as in FIG. 5), a high voltage pulse is generated in the downward stroke and another pulse of the opposite polarity is generated on the upward stroke. By routing these pulses through bridge rectifier 28 with diodes 27, the output pulses of a single generating module 1 circuit 29 will always be of the same polarity. The bridge rectifier also prevents reverse current flow from any source connected to its output.

Figure 6:
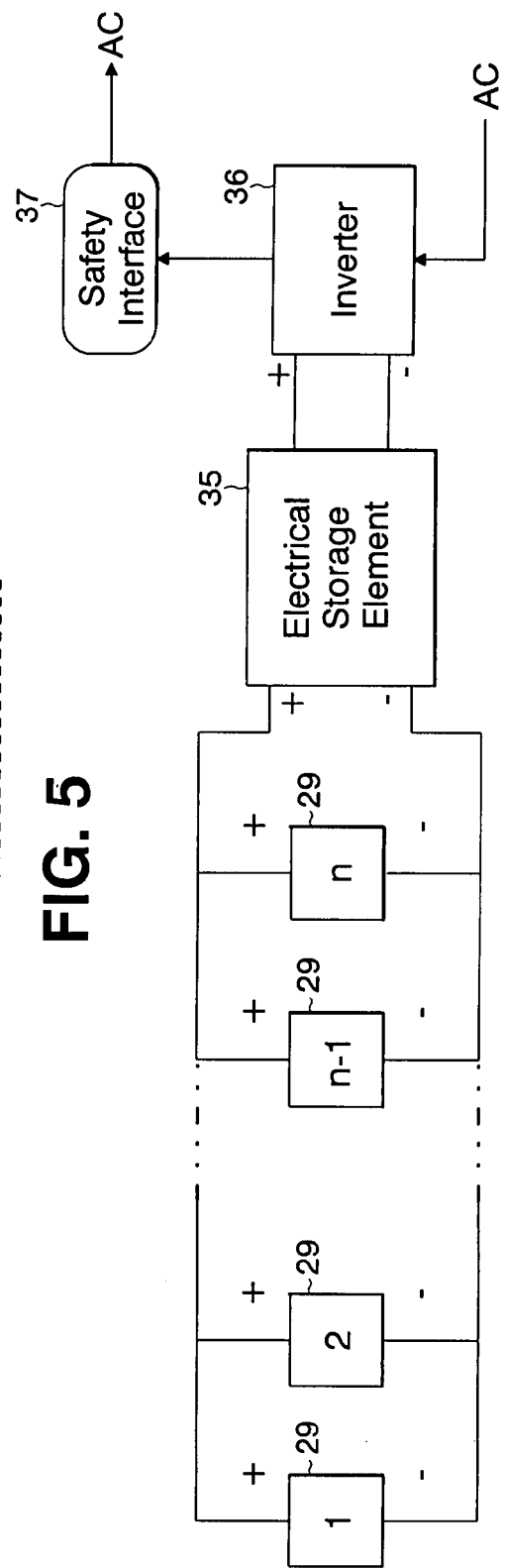
FIG. 6 is a Schematic diagram of a network of multiple generating modules.

Hence, the network shown in FIG. 6 can be used to convey the outputs of "n" generating module circuits 29 in a parallel fashion to a common DC electrical storage element 35. This can be done even though the pulses of the different modules 29 are not synchronized with each other. Storage element 35 can be a variety of storage batteries such as lead acid or nickel metal hydride, or it can also be a multi-farad storage capacitor. When the state of charge is determined to be sufficient by detectors within synchronous inverter 36, it is started and its output is matched to AC line voltage sampled at its input. AC output is then fed through a utility specified safety interface 37 to the AC distribution network.

The use of multiple coils and magnets in the linear magneto elements creates the opportunity for high voltage pulses which are degraded minimally by diodes 27. Furthermore, long transmission distances of the modest currents necessary to convey significant power at high voltage is facilitated with low loss as compared to the situation of moving large currents at lower voltage.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended claims.

I claim:

1. A motor vehicle-actuated electrical generating system disposed within pavement of a roadway, comprising:
   (a) A roadway having a surface and a plurality of spaced-apart elongated hollows extending downward vertically from said roadway surface, said hollows respectively having magnetos disposed therein;
   (b) said magnetos each respectively comprising a plunger, said plunger being alternately movable between a raised position and a lowered position, said plunger extending vertically downward from said roadway surface within each respective said elongated hollow; and
   (c) said plunger having an upper end comprising a roadway treadle, said treadle bearing on said plunger; said treadle being substantially parallel with said roadway surface when said plunger is in said raised position; and
   (d) said plunger having a lower end, said lower end being mounted to a compressible spring, said spring urging said plunger into said raised position;
   (e) said plunger being caused to move from said raised to said lowered position by the application of vehicle tire weight upon said treadle, and;
   (f) said plunger being caused to move from said lowered to said raised position by said spring when vehicle tire weight upon said treadle is released; and wherein further;
   (g) said elongated hollows have mounted therewithin a plurality of vertically spaced-apart electrical coils, said coils each having a respective central aperture, said central apertures of said coils comprising a central vertical void through which said plunger extends; and
   (h) said plunger having a plurality of vertically spaced-apart magnets mounted thereon, said magnets being vertically movable with the movement of said plunger alternately between said raised and lowered positions;
   (i) said magnet movement being in close electrically-generating effective proximity to said coil, said magnet movement causing a flow of electrons within said coils; and
   (j) said coils being electrically connected so as to effectively and usefully collect the energy arising from the induced electron flow within said coils.

2. The motor vehicle-actuated electrical generating system of claim 1, wherein said spaced-apart elongated hollows are arranged in transverse rows within said roadway, said transverse rows being perpendicular to the direction of vehicle travel on said roadway.

3. The motor vehicle-actuated electrical generating system of claim 2 wherein said elongated hollows are disposed within at least one expansion joint within said roadway.

4. The motor vehicle-actuated electrical generating system of claim 1, wherein said spaced-apart elongated hollows are arranged in at least one longitudinal band, said at least one longitudinal band comprising an elongated area of roadway surface parallel to the direction of vehicular travel, at least one longitudinal band being positioned in a portion of the surface of said roadway having the greatest likelihood of being contacted by the tires of vehicles on said roadway.

5. The motor vehicle-actuated electrical generating system of claim 4, wherein said at least one longitudinal band has a width sufficient to accommodate a plurality of said spaced-apart elongated hollows disposed in rows perpendicular to the direction of vehicular traffic on said roadway.

6. The motor vehicle-actuated electrical generating system of claim 1 wherein said induced electrical energy is produced by the direct motion of said vertically spaced-apart plunger magnets in effective proximity to said vertically spaced-apart electrical coils without the use of additional mechanical movers other than as herein claimed in order to capture, transmit, translate and convert mechanical energy into electrical energy.

7. The motor vehicle-actuated electrical generating system of claim 1 wherein at least two of said spaced-apart elongated hollows are positioned in close proximity to each other to comprise at least one electrical generating module, said module having a hinged top plate comprising a cam wherein said cam is in mechanical contact with said plungers of said at least two of said spaced-apart elongated hollows, said cam being rotatably movable between a raised position and a depressed position when actuated by downwardly directed vehicle tire pressure; said cam downwardly depressing simultaneously each plunger within said at least two said spaced-apart elongated hollows for synchronizing the electrical output of said at least two spaced-apart elongated hollows.

8. The motor vehicle-actuated electrical generating system of claim 7 wherein said vertically spaced-apart electrical coils are wired in series and wherein said at least one electrical generating module comprises at least one bridge rectifier to produce high-voltage uni-directional voltage pulses with each stroke of said plungers within said at least two spaced-apart elongated hollows.

9. The motor vehicle-actuated electrical generating system of claim 7 wherein said electrical generating modules are wired in parallel and wherein the electrical output of said electrical generating modules is sent to at least one electrical storage device.

10. The motor vehicle-actuated electrical generating system of claim 9, wherein said electrical storage device comprises electrical charge storage device, a sensor sensing the state and sufficiency of said stored electrical charge, a trigger synchronous inverter, said synchronous inverter supplying the energy stored electrical charge to AC lines when triggered to do so by said trigger.

11. The motor vehicle-actuated electrical generating system of claim 7 comprising a plurality of said generating modules, and further comprising said electrical storage device storing the electrical output of said plurality of generating modules.

12. The motor vehicle-actuated electrical generating system of claim 11 wherein said electrical storage device comprises at least one battery.

13. The motor vehicle-actuated electrical generating system of claim 11 wherein said electrical storage means comprises at least one capacitor.

14. The motor vehicle-actuated electrical generating system of claim 1 wherein said vertically spaced-apart electrical coils are wired in series to produce electrical output with synchronous polarity.

15. The motor vehicle-actuated electrical generating system of claim 14, further comprising a bridge rectifier for preventing reverse current flow during electrical generation.

16. The motor vehicle-actuated electrical generating system of claim 1 wherein said spaced-apart elongated hollows comprise sealing gaskets disposed at the surface of said roadway for sealing said elongated hollows; said treadle having a noise reducer damping the sounds of tires contacting said treadle.

\* \* \* \* \*